United States Patent
Takahashi et al.

[11] Patent Number: 5,970,881
[45] Date of Patent: Oct. 26, 1999

[54] LINEAR TYPE SHUTTLE WITH MOVABLE LINEAR MOTOR PRIMARY

[75] Inventors: Susumu Takahashi, Funabashi; Ryuichi Ishibashi, Chiba-Ken; Darin Friedmann, Tomisato, all of Japan

[73] Assignee: Otis Elevator Company, Farmington, Conn.

[21] Appl. No.: 09/010,569

[22] Filed: Jan. 21, 1998

[51] Int. Cl.[6] ............................. B60V 3/00; B60L 13/00
[52] U.S. Cl. .......................................... 104/23.2; 104/293
[58] Field of Search .................................. 104/23.1, 23.2, 104/281, 282, 284, 286, 290, 292, 293

[56] References Cited

U.S. PATENT DOCUMENTS

| | | | |
|---|---|---|---|
| 3,680,489 | 8/1972 | English | 104/293 |
| 3,800,708 | 4/1974 | English et al. | 104/293 |
| 5,058,505 | 10/1991 | Uehira | 104/292 |
| 5,117,136 | 5/1992 | Kobayashi et al. | 104/293 |
| 5,542,356 | 8/1996 | Richert et al. | 104/292 |

*Primary Examiner*—Mark T. Le

[57] ABSTRACT

A linear-type shuttle has an air pad 4 that blows air toward a track 5, a chassis 2 that floats above the track 5 due to the air pad 4, a primary side 6a of a linear motor that is installed to be vertically movable on the chassis 2 and that drives the chassis horizontally together with a secondary side 6b on the track 5, a brake skid 11 disposed on the chassis 2 that makes friction contact with the track 5 when the chassis 2 is not floating above the track 5, an operating lever 17 pivotally mounted to the chassis 2 and having one end connected to the primary side 6a, a spring 23 that always forces the primary side 6a upward away from the secondary side 6b via the lever 17, and an electromagnet 20 that moves the primary side 6a downward via the lever 17 against the force of the spring 23 to a predetermined position in relation to the secondary side 6b, such that, when the car 1 is floating, the gap 60 between the primary side 6a and the secondary side 6b of a linear motor is as narrow as possible so that the linear motor will be driven efficiently.

1 Claim, 8 Drawing Sheets

LINEAR TYPE SHUTTLE WITH MOVABLE LINEAR MOTOR PRIMARY

TECHNICAL FIELD

The present invention relates to a linear type shuttle and more particularly to linear shuttles with a movable linear motor primary side.

BACKGROUND OF THE INVENTION

In advanced and complicated city spaces such as airports, business parks, shopping centers, resort facilities, etc., a safe means of transportation for a short distance with a low noise and low vibration level is in demand. As a response to such a demand, a linear shuttle that applies a linear type elevator in a horizontal direction may be employed.

Referring to FIG. 8, on a chassis 101a of a linear shuttle car 101, instead of using wheels to run the car 101 along a track 105, an air pad 102 is used to float the car 101 above the track 105. When air is blown onto the track 105 from the air pad 102, the car 101 will float and a thin air film is formed between the car 101 and the track 105. The car 101 can then run smoothly in the horizontal direction. The car 101 is moved horizontally by a linear motor having a primary side 103a disposed on the bottom of the chassis 101a, and a secondary side 103b disposed on the track 105.

Referring to FIG. 9, a brake skid 104 (not shown in FIG. 8) is provided on the chassis 101a. When the chassis 101a floats above the track 105, the brake skid 104 also leaves the track 105 and there is no braking action of the brake skid 104. Thus, the car 101 will be able to run. Referring to FIG. 10, on the other hand, when the car 101 is not floating, the brake skid 104 will be in frictional contact with the track 105, and the car 101 is braked (or stopped). Accordingly, with this type of conventional linear type shuttle, the brake skid 104 needs to be separated from the track 105 to allow the car 101 to run. That is, the chassis 101a needs to be floated from the track 105.

Referring to FIGS. 9 and 10, when the brake skid 104 is in contact with the track 105, a gap 60 between the primary side 103a and the secondary side 103b of the linear motor is narrow, e.g., approximately 5 mm. If the car 101 is floated to allow the car 101 to run horizontally, a gap 62 is created between the skid 104 and the track 105, having a distance of, e.g., approximately 14 mm. In that case, the gap 60 increases to approximately 19 mm. However, the ideal gap 60 between the primary side 103a and the secondary side 103b should be as narrow as possible, e.g., approximately 5 mm, to efficiently drive the linear motor. Accordingly, such an increase in the gap 60 reduces motor efficiency.

DISCLOSURE OF THE INVENTION

An object of the present invention is to drive a linear motor of a shuttle efficiently by making the gap between the primary side and the secondary side of the linear motor as narrow as possible even when the car is floating.

According to the present invention, a shuttle system comprises an air pad that blows air toward a track; a chassis that floats above the track when the air is blown toward the track; a linear motor having a primary side disposed on the chassis and a secondary side disposed on the track, which moves the chassis along the track, the primary being movable with respect to the secondary causing the distance between the primary and the secondary to change; a brake skid disposed on the chassis, which makes friction contact with the track when the chassis is not floating above the track; and moving means connected to the chassis and the primary, for moving the primary toward the secondary when the chassis is floating and away from the secondary when the chassis is not floating.

With the present invention, when the shuttle car is floating, a driving current is supplied to an electromagnet to lower the primary side of the linear motor to a predetermined position, thereby providing a narrow gap between the primary side and the secondary side. Thus, the driving force of the linear motor can be most efficiently used. Also, when the car is floating and stopping, if the primary side is lowered by the electromagnet, the gap between the primary side and the secondary side is also narrow. In that case, the car is in a state ready to run, so it can start running promptly. Furthermore, in the event that no driving current is supplied to the car at all, e.g., due to a blackout, etc., the primary side will remain elevated at a large gap value so it will not collide with the secondary side. Then, after the electricity is restored, the linear motor can be used again without any damage to the system.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

Figure 6:
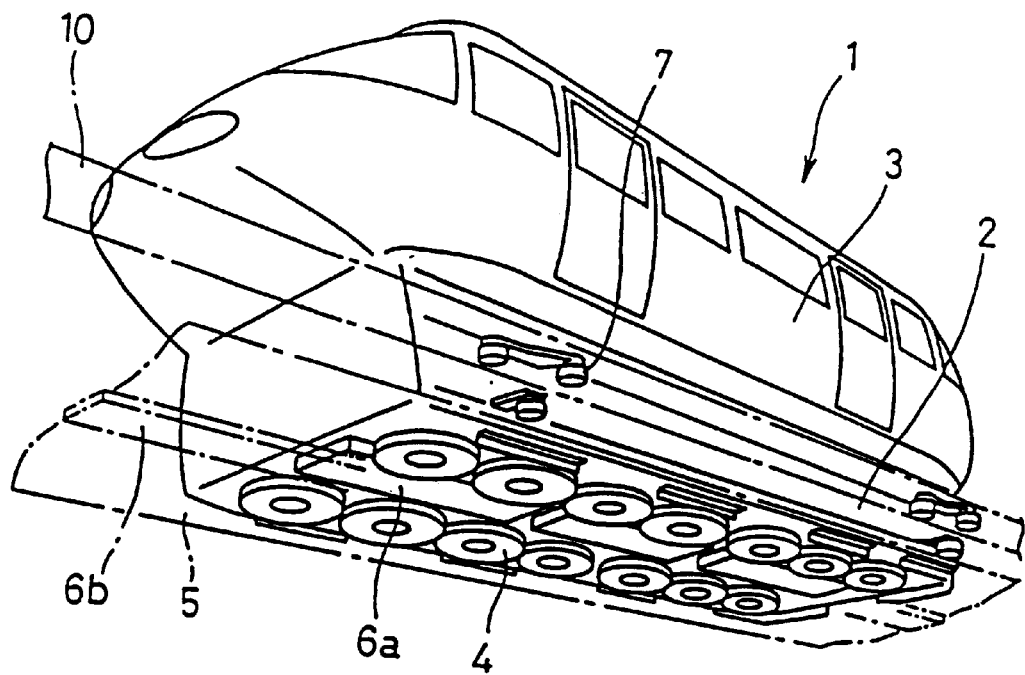
FIG. 6 is a perspective view of an entire linear type shuttle, in accordance with the present invention.

Referring to FIG. 6, a linear type shuttle system of the present invention comprises a car 1. The linear shuttle car 1 comprises a glass-fiber-reinforced plastic (FRP) car body 3 on a chassis 2 that is made of a light alloy. Therefore, the car 1 is much lighter than a car that is used for a conventional means of transportation. When air is blown toward the track 5 from an air pad 4 provided on the chassis 2, the light car 1 is floated above the track 5.

A primary side 6a of a linear motor is disposed on a bottom side of the chassis 2, and a secondary side 6b of the linear motor is disposed on the track 5. When the car 1 floats above the track 5 and a thin air film is formed between the car 1 and the track 5, if the linear motor 6a and 6b is driven, the car 1 will run smoothly in the horizontal direction.

Figure 7:
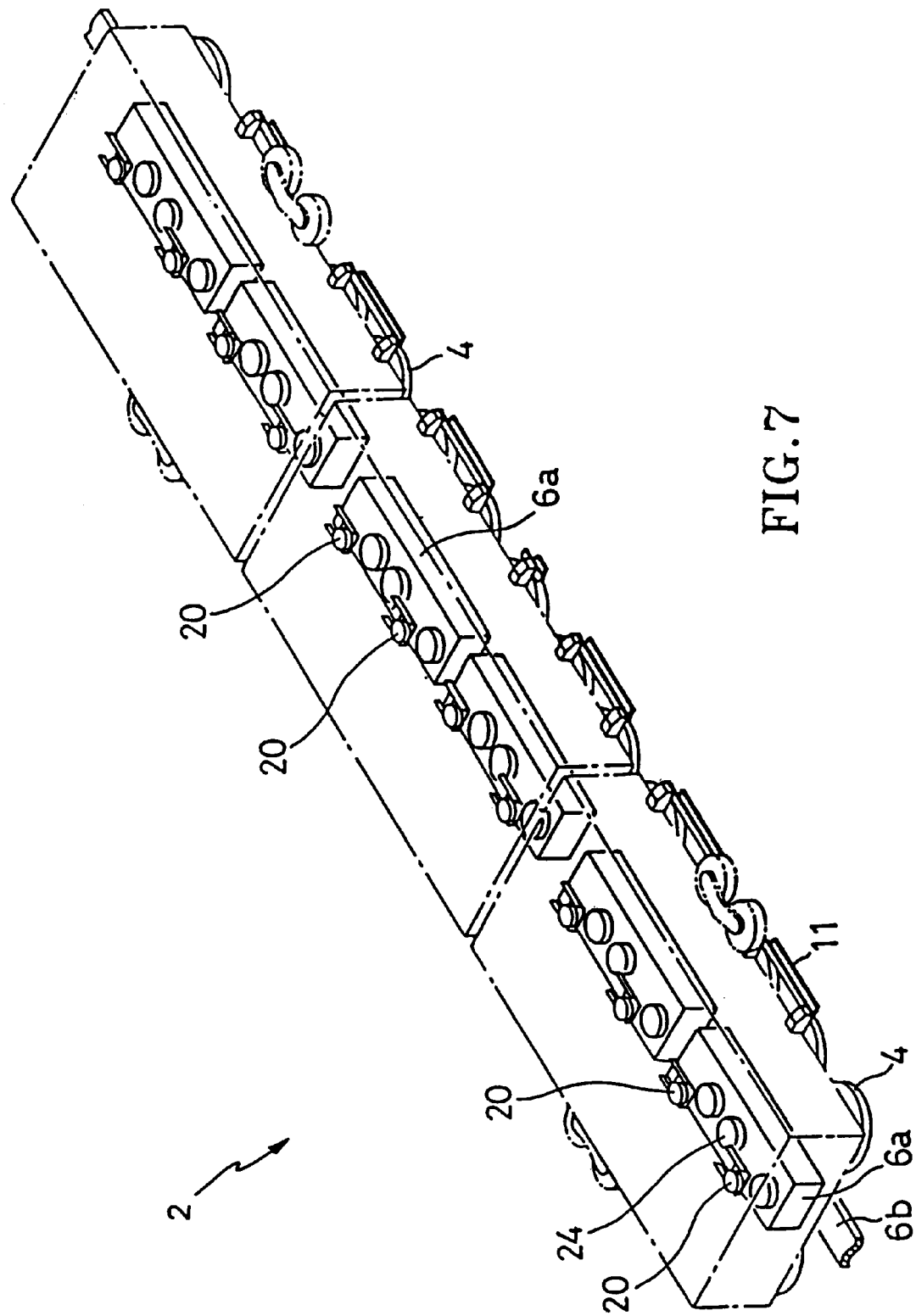
FIG. 7 is a perspective view of a shuttle chassis, in accordance with the present invention.
Figure 8:
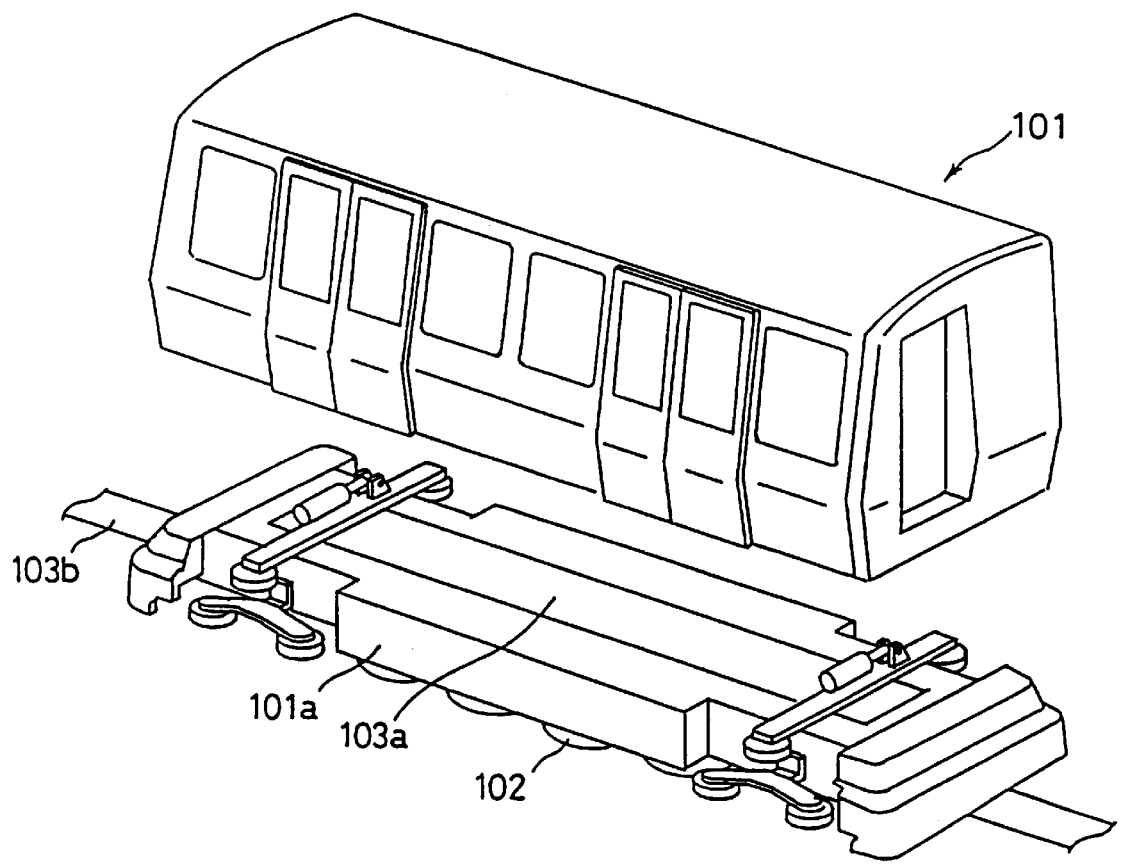
FIG. 8 is a perspective view of a disassembled conventional linear type shuttle.
Figure 9:
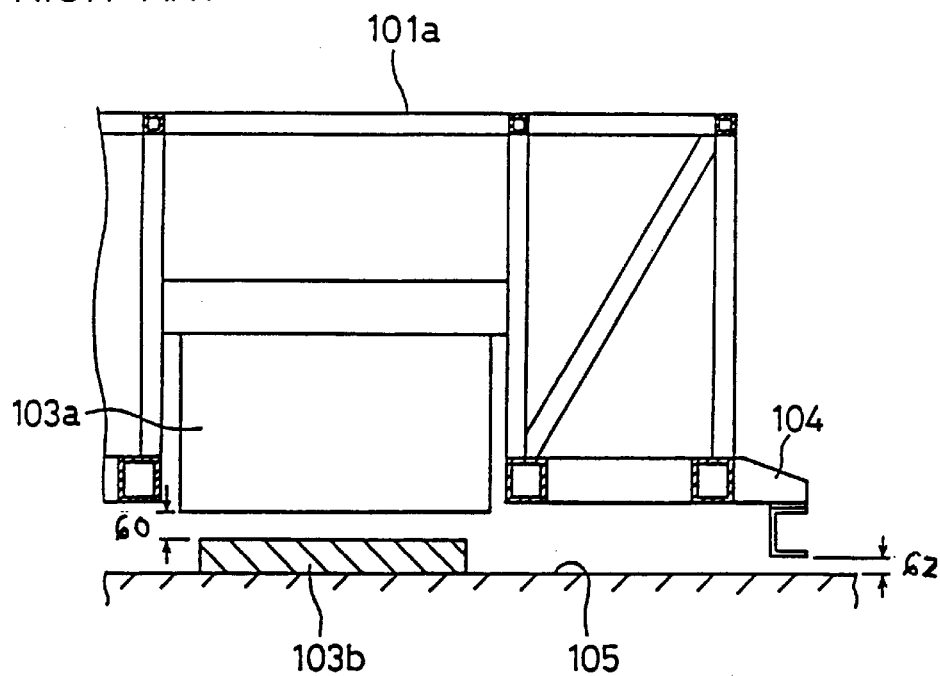
FIG. 9 is a front view of a conventional linear motor when the shuttle is floating.
Figure 10:
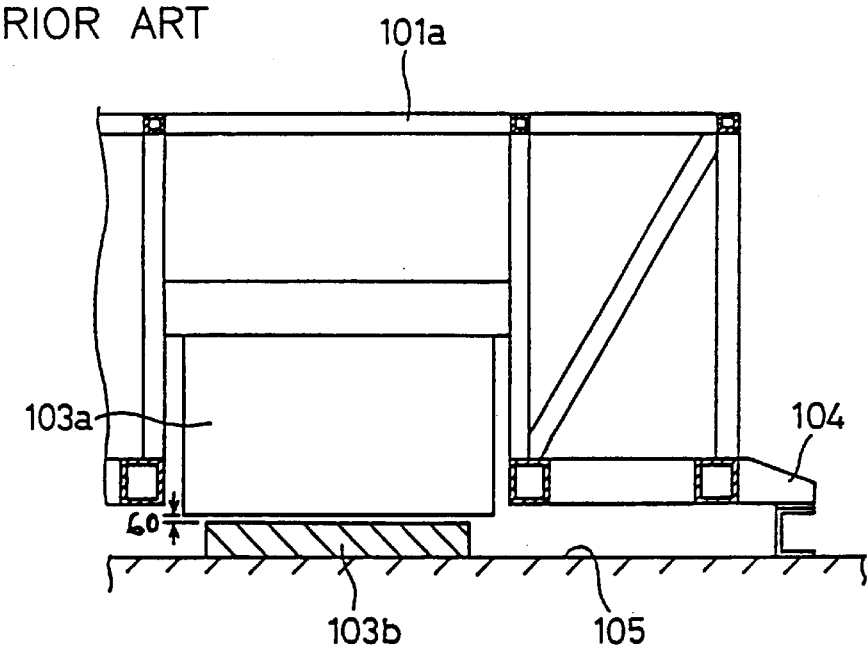
FIG. 10 is a front view of a conventional linear motor when the shuttle is not floating.

Referring to FIGS. 6 and 7, guide tires 7 are provided in a pair on the sides of the chassis 2. The guide tires 7 are in contact with guide rails 10 (FIG. 6) placed on both ends of the track 5. A brake skid 11 (FIG. 7) is disposed on a side of the chassis 2 to act as a brake to stop the car 1. When air is not flowing from the air pad 4, the car 1 will not float, the brake skid 11 will have frictional contact with the track 5, and the car 1 will be braked or stopped.

Figure 1:
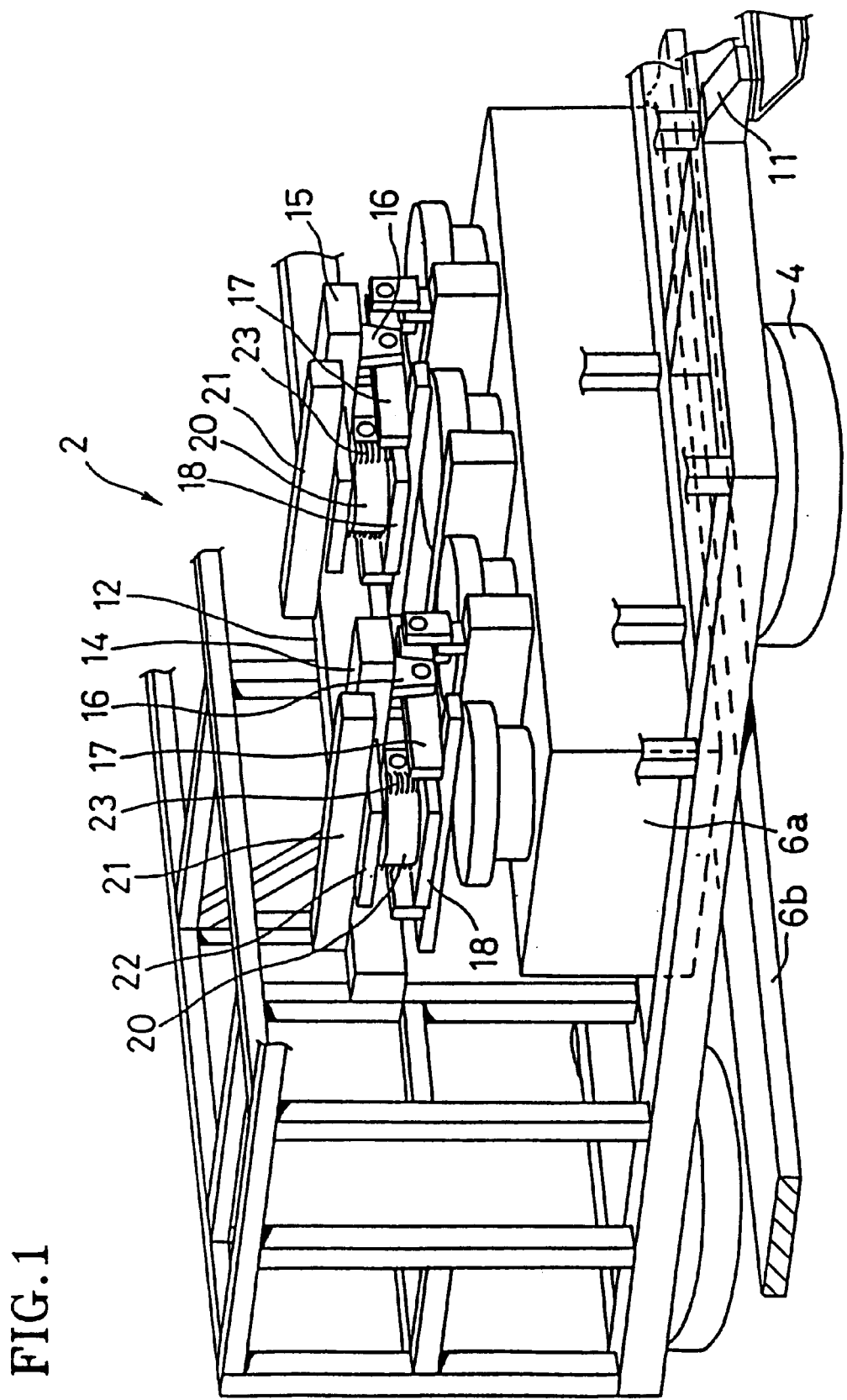
FIG. 1 is a perspective view that illustrates an embodiment of a linear type shuttle, in accordance with the present invention.
Figure 2:
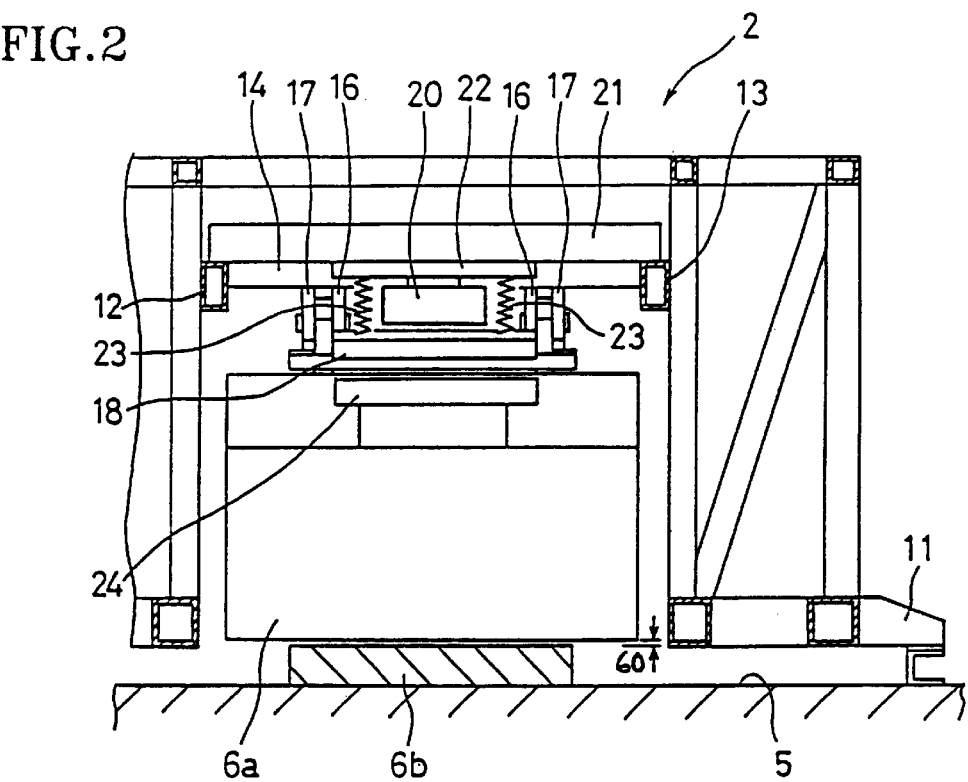
FIG. 2 is a front view of the primary side of the linear motor when the shuttle is not floating, in accordance with the present invention.
Figure 3:
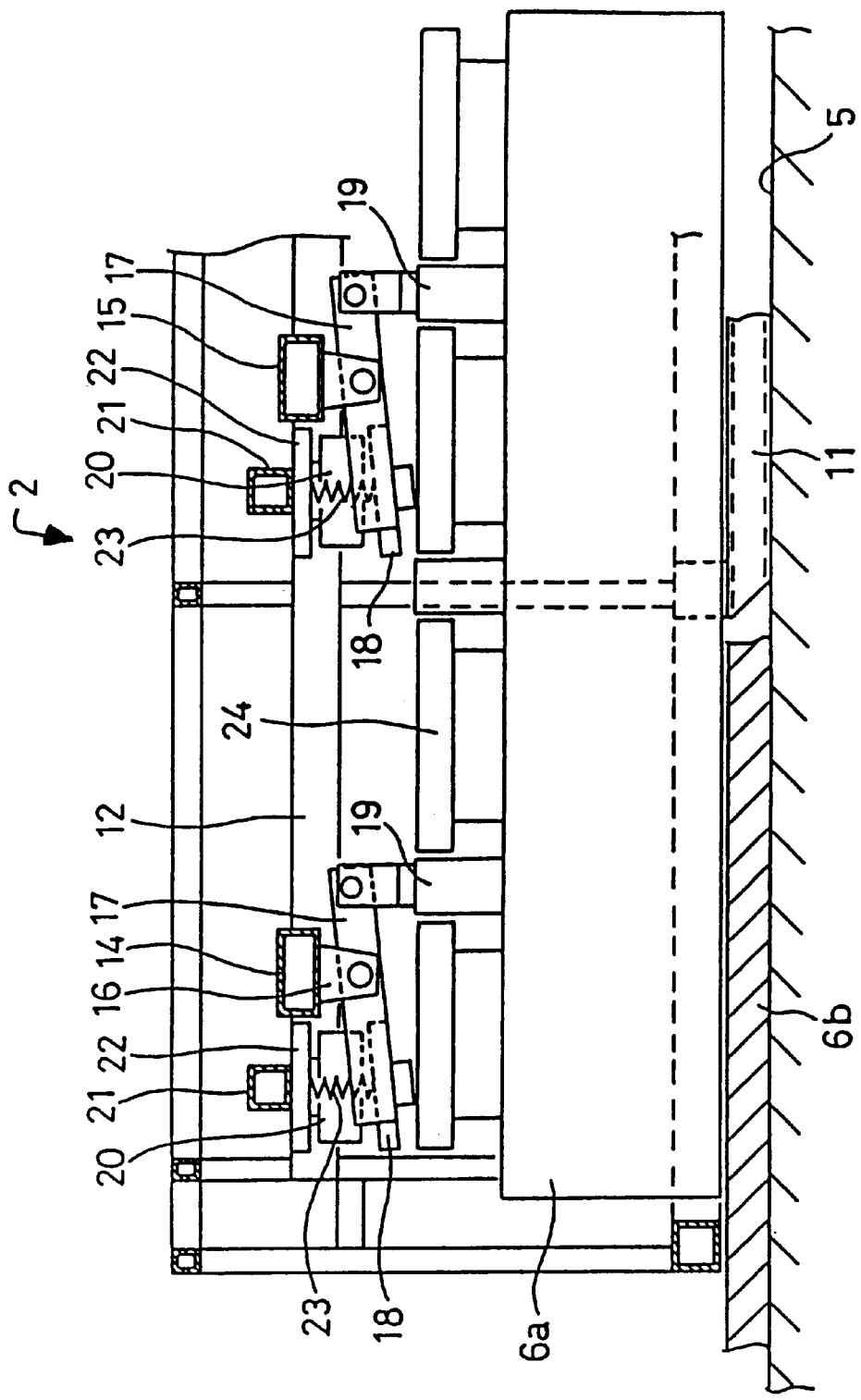
FIG. 3 is a side view of a portion of FIG. 2, in accordance with the present invention.

Referring to FIGS. 1 to 3, the chassis 2 comprises a pair of support members 14,15 that are bridged across support members 12,13 disposed on a truss. A support piece 16 is disposed on the support member 14, and an operational lever 17 is pivotally mounted to the support piece 16 such that it can swing freely. A steel plate 18 is disposed on one end of the lever 17, and the other end of the lever 17 is pivotally mounted to suspension means 19 which is connected to the upper face of the primary side 6a of the linear motor. Also, a cooling fan 24 is provided on the upper face of the primary side 6a.

An electromagnet 20 is positioned above the steel plate 18. The electromagnet 20 is attached on a support member 21 bridged across the members 12, 13. A spring bracket 22 is also installed on the support member 21. A compression spring 23 is installed in a compressed state between the spring bracket 22 and the steel plate 18. Similarly, the support member 15 has the same components which operate in the same way as described above and are designated by the same reference numerals.

When driving current is supplied to the electromagnet 20, the electromagnet 20 will pull the steel plate 18 against the energizing force of the compression spring 23. The operational lever 17 will swing and the primary side 6a will move from an upper position down to a predetermined lower position. When the supply of the driving current to the electromagnet 20 is stopped, the steel plate 18 is separated from the electromagnet 20 due to the force of the compression spring 23. The primary side 6a will then move up to the upper position by the swinging of the operational lever 17. The primary side 6a is shaped similar to a box and faces the secondary side 6b which is laid on the track 5 like a rail. When driving current is supplied to the primary side 6a, the primary side 6a is pulled toward the secondary side 6b, and the linear motor is driven in the horizontal direction.

Figure 4:
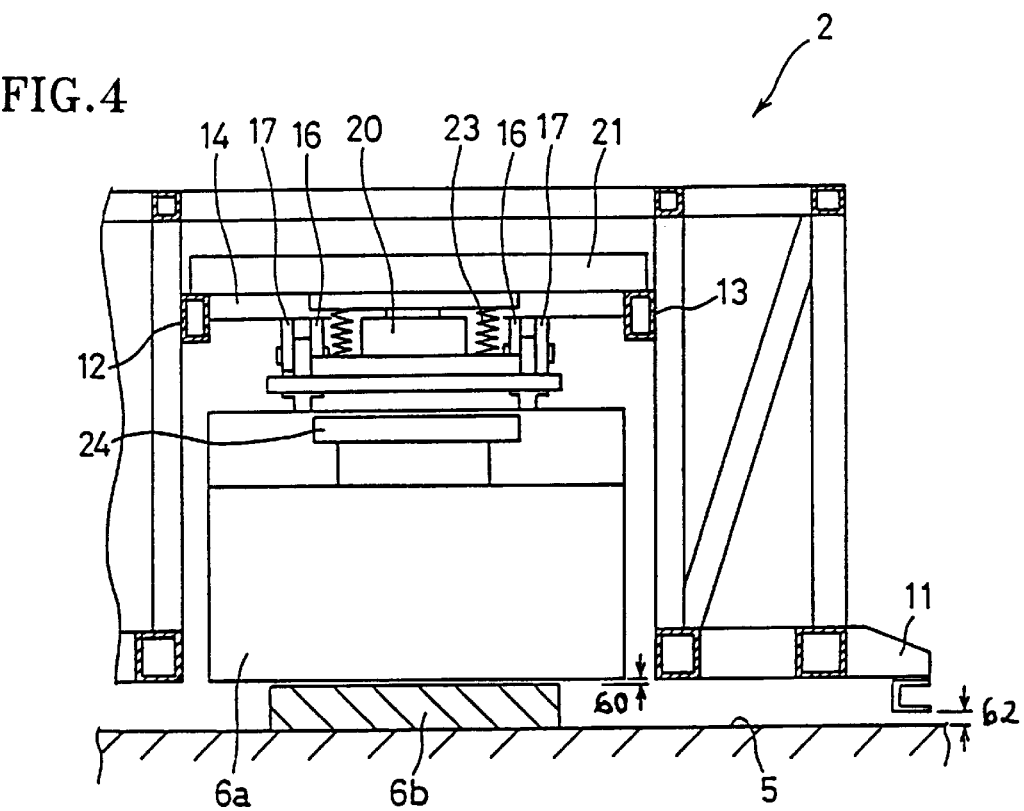
FIG. 4 is a front view of the primary side of the linear motor when the shuttle is floating, in accordance with the present invention.
Figure 5:
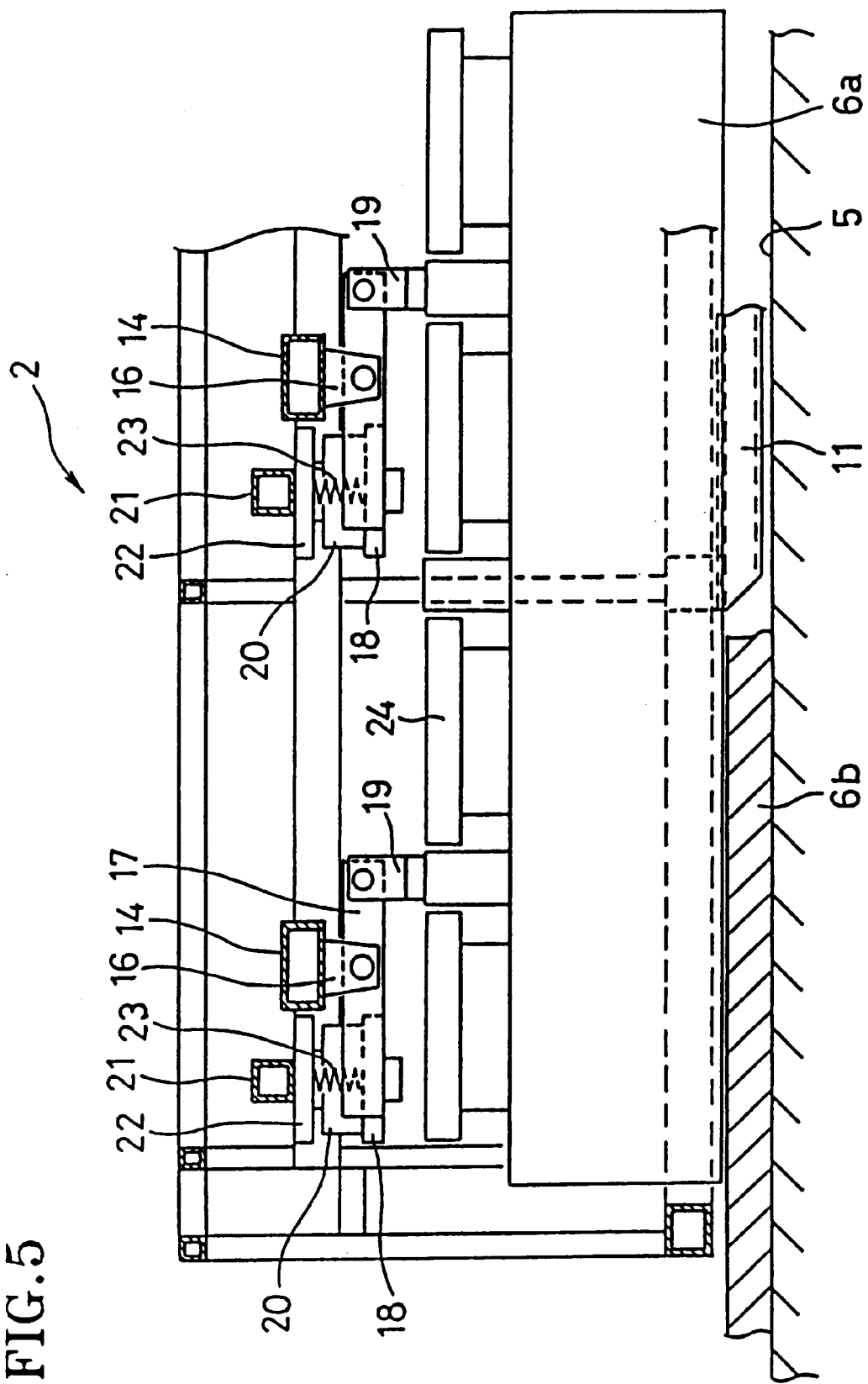
FIG. 5 is a side view of a portion of FIG. 4, in accordance with the present invention.

Referring to FIGS. 4 and 5, air, which is provided from a blower (not shown), flows from the air pad 4 toward the track 5, and causes the chassis 2 to float. When the chassis 2 floats, the gap 62 (approximately 14 mm) is formed between the brake skid 11 and the track 5.

Next, when the driving current is supplied to the primary side 6a and to the electromagnet 20, the lever 17 will swing as discussed hereinbefore and moves the primary side 6a downward to a lower position toward the secondary side 6b. Because of this movement, the gap 60 between the primary side 6a and the secondary side 6b is maintained to be a narrow clearance, e.g., approximately 5 mm, and the linear motor is most efficiently driven.

When the car 1 nears a station building, the supply of driving current to the primary side 6a of the linear motor is reduced. The car 1 will then reduce speed and stop at the station building, and the driving current is stopped. Even after this stopping, if air is flown from the air pad 4 toward the track 5, the car 1 will be in a floating state. At this time, even if the supply of driving current to the primary side 6a is stopped, if the supply of driving current to the electromagnet 20 is not stopped, the clearance between the primary side 6a and the secondary side 6b will be maintained to be approximately 5 mm, which is an appropriate clearance needed for the efficient driving of the linear motor. Thus, the car 7 is always in a state ready to run, and when the driving current is supplied to the primary side 6a, it will run promptly.

Alternatively, in the event that no driving current is supplied to the car 1 at all, e.g., due to a blackout, etc, the blower, which provides air to the air pad 4, will stop, the chassis 2 descends from the floating position (approximately 14 mm from the track 5), and the brake skid 11 is grounded to the track 5. In that case, because no driving current is supplied, the operational lever 17 will swing away from the magnet 20 by the force of the compression spring 23, and the primary side 6a will move up to the upper position. Thus, even if the brake skid 11 is grounded to the track 5, the primary side 6a will not collide with the secondary side 6b. Then, after the electricity is restored, the linear motor can be used again without any damage occurring to the system.

Although the invention has been described and illustrated with respect to exemplary embodiments thereof, it should be understood by those skilled in the art that the foregoing, and various other changes, omissions and additions may be made without departing from the spirit and scope of the present invention.

What is claimed is:

1. A shuttle system, comprising:

a track;

chassis disposed above said track;

an air pad disposed on said chassis that blows air on said track so that said chassis floats above said track when said air is blown toward said track;

a linear motor having a primary disposed on said chassis and a secondary disposed on said track, said linear motor moves said chassis along said track, said primary being movable with respect to said secondary causing the distance between said primary and said secondary to change; and moving means connected to said chassis and said primary, for moving said primary toward said secondary when said chassis is floating and for moving said primary away from said secondary when said chassis is not floating, said moving means comprising a spring, a lever having one end connected to said primary and another end which contacts said spring, said spring continuously exerts a force on said lever in a direction to move said primary away from said secondary, and an actuator that, when actuated, moves said lever in a direction to move said primary toward said secondary, against the force of said spring, to a predetermined position in relation to said secondary.

* * * * *